3,127,596
DEVICE FOR INDICATING VARIATIONS OF
POSITION BETWEEN TWO ELEMENTS
Karl Alfred Näsholm, Goteborg, Sweden, assignor to Aktiebolaget Götaverken, Goteborg, Sweden, a corporation of Sweden
Filed May 21, 1962, Ser. No. 196,279
Claims priority, application Sweden June 19, 1961
3 Claims. (Cl. 340—269)

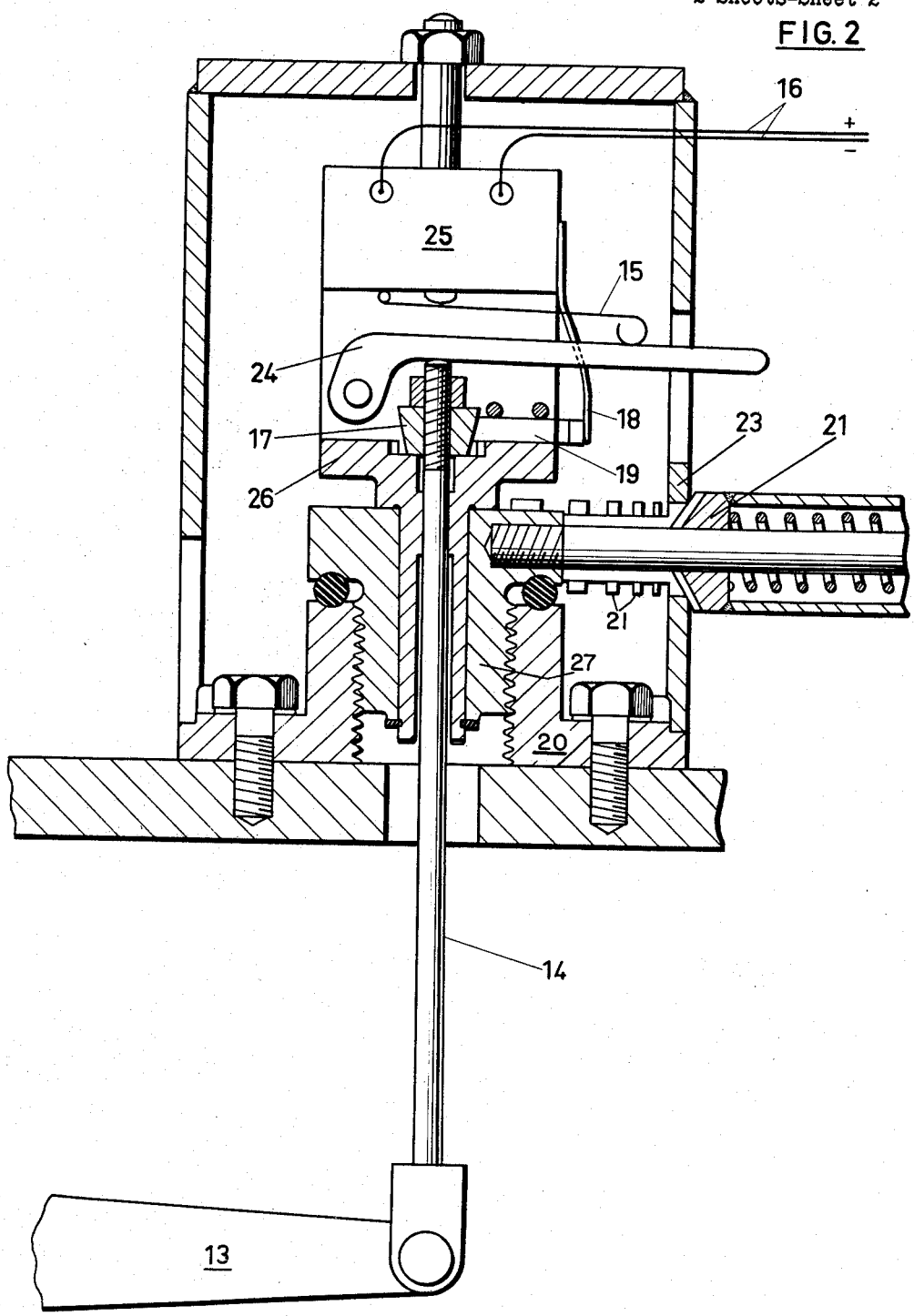

In elements movable relative to each other, for instance parts of a bearing, a wear is unavoidable. Some circumstances can cause such wear to occur very rapidly, and if the bearing is fitted into a machine or in some other way is not easily reached for inspection, the wear can cause great damages before counter-measures can be taken. Typical examples are cross head bearings and gudgeon pin bearings in large internal combustion engines, in which the risk besides a break down of the engine, can lie therein that the bearing may run hot, thereby igniting the gas in the crankcase and causing an explosion, the effect of which will reach far outside the engine.

An object of the invention is to provide a device by means of which it is easy to discover the wear at an early stage and which automatically will call the engine staff's attention by giving alarm.

Another object of the invention is to provide by means of which the point for giving alarm is easily adjustable and which permits checking of the remainder of the permissible wear and of the alarm member independently of the position of the main actuator part.

Another object of the invention is to provide an extremely sensitive device containing a number of cooperating levers which transfer even an inconsiderable variation of position to a movement many times greater at the alarm.

On the accompanying drawings one embodiment of the invention is shown by way of example as applied to indicate the wear of the cross head bearing in a large internal combustion engine.

FIGURE 2 shows an embodiment of the proper device on a larger scale.

Figure 1:
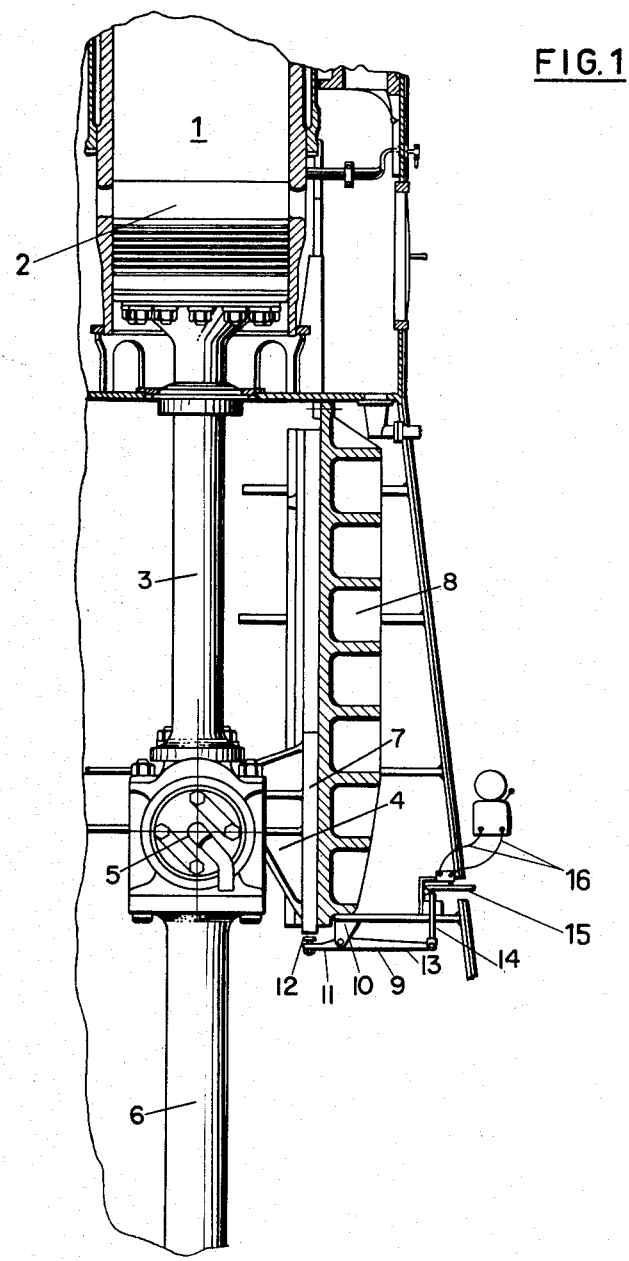
FIGURE 1 is a partial cross section of the referred parts of the engine.

In the figures numeral 1 denotes the engine cylinder in which there is a piston 2. This is my means of a piston rod 3 connected to a cross head 4, which in its turn supports a cross head pin 5. To this a connecting rod 6 is fitted in the usual manner. The cross head is provided with a shoe 7, which is guided by a cross head guide 8 supported by the entablature. The movement of the cross head shoe is thus rectilinear along the cross head and as long as the bearing of the cross head pin is undamaged there will be a determined lower turning point for the shoe. In connection with the attachment of the cross head guide there is a double-armed lever 9, which is mounted on a fulcrum in a bracket 10 fixed to the entablature. One shorter arm 11 of the lever is provided with an adjustable stop lug 12 intended to be actuated by the cross head shoe. In its evident that the lug on said lever arm can be fixed in such a relation to the turning point of the cross head shoe, that even an extension of one tenth of a millimeter in the normal path will actuate the lever. The second, longer arm 13 of the lever is connected with a pusher rod 14, which actuates a switch 15 of an electric alarm system, here only schematically shown by cables and an alarm bell.

In FIGURE 2 the details of the alarm system are shown in detail. At the upper part of the pusher rod 14 there is a tapered body 17, which cooperates with a correspondingly designed catch 19 actuated by a spring 18. The weight of the longer lever arm 13 and the pusher rod 14 is far greater than that of the shorter arm which results in that the tapered body normally rests on the bottom part 26 of the housing for the alarm device. The lever will in this manner be carried by the housing with a possibility to move only in one direction in relation to the housing. Even a very small deflection of the arm 11 results in a lifting of the pusher rod, which movement, owing to the influence of the catch 19, cannot be followed by a return movement. The deflection thus brings the pusher rod closer to the alarm.

In order to make it possible to adjust the position of the lever, the housing of the alarm device is provided with a threaded dowel 27 running in a nut 20 attached to the frame. The whole housing can be turned on this by means of a ratchet handle 21, which in a suitable manner is brought about to cooperate with a number of grooves 22 arranged in a protective cover 23 enclosing the device. By turning the housing the body 17 and the pusher rod 14 will be raised or lowered in relation to the attachment which of course brings about a corresponding movement of the shorter lever arm. The spacing of the grooves can for instance be so chosen, that one distance corresponds to a vertical alteration of one tenth of a millimeter at the stop lug 12.

In order further to enlarge the deflection from the lever arm 9 the pusher cooperates with a single-armed lever 24 which in its turn actuates the switch arm 15. The lever arm extends through the protective cover and can be used for manually controling of the wear and the function of the alarm system, respectively. If the housing by the aid of the handle is turned sufficiently to bring the lug 12 into contact with the guide shoe, the turning movement will indicate how much of the originally calculated permissible wear is still remaining. If the lever 24 is moved upwards without the position of the ratchet handle being changed, the switch will be closed and it will be possible to check if the alarm system is operative.

The lever 24 enlarges of course also the obtained deflection so that the sensitivity of the device is increased. The free end of the lever reaches outside the housing of the alarm system in such a manner that the above-mentioned control measures can easily be performed. The electric switch construction is not illustrated in detail. It may be of any arbitrary kind, and instead of the bell shown, any suitable optic or acoustic alarm member may of course be used. The device may, when used in engines or apparatuses driven thereby, also be designed to actuate the power supply in order to stop the plant.

What I claim is:

1. A device for indicating unpermissible wear of a bearing in a reciprocatory mechanism, which comprises, in combination, a double-armed lever with one short and one long arm fitted on a fulcrum at the entablature of the reciprocating mechanism in a manner to place the end of said short arm in a position to be actuated by an unpermissible movement of a reciprocatory element in said mechanism;

an alarm member enclosed in a casing supported by said entablature above the outer end of the longer arm of said lever and having an actuator for contacting said alarm member;

a pusher do resting on the end of said longer arm and reaching into said casing, the upper end of said rod being normally axially spaced from said actuator; and a member in said casing carrying said rod and permitting its movement into, but preventing its movements outwards from, said casing.

2. A device for indicating unpermissible wear of a bearing in a reciprocatory mechanism which comprises, in combination,
- a double-armed lever with one short and one long arm fitted on a fulcrum at the entablature of the reciprocating mechanism in a manner to place the end of said short arm in a position to be actuated by an unpermissible movement of a reciprocatory element in said mechanism;
- an alarm member enclosed in a casing consisting of a bottom part and a top part and being supported by said entablature above the outer end of the longer arm of said lever;
- an actuator in the top part of said casing for contacting said alarm member;
- a pusher rod resting on the end of said longer arm and reaching into said casing, the upper end of the said rod being normally axially spaced from said actuator;
- a member in the bottom part of said casing carrying said rod and permitting its movements into, but preventing its movements outwards from, said casing; and
- means to displace the top part of said casing in relation to the bottom part thereof in the axial direction of the pusher rod to vary the distance between the end of said rod and the actuator.

3. A device for indicating unpermissible wear of a bearing in a reciprocatory mechanism which comprises, in combination,
- a double-armed lever with one short and one long arm fitted on a fulcrum at the entablature of the reciprocating mechanism in a manner to place the end of said short arm in a position to be actuated by an unpermissible movement of a reciprocatory element in said mechanism;
- an alarm member enclosed in a casing supported by said entablature above the outer end of the longer arm of said lever and having an actuator for contacting said alarm member;
- a pusher rod resting on the end of said longer arm and reaching into said casing, the upper end of the said rod being normally axially spaced from said actuator;
- a member in said casing carrying said rod and permitting its movement into, but preventing its movements outwards from, said casing; and
- a single-armed lever turnable about a second fulcrum in said casing and extending through an opening in the wall of said casing to form a handle outside thereof;
- said single-armed lever resting freely on the end of said pusher rod and being arranged to contact said alarm member by a movement of the pusher rod and, independently of said pusher rod, by actuation of said handle.

References Cited in the file of this patent

UNITED STATES PATENTS

| | | |
|---|---|---|
| 1,788,941 | Bradley et al. | Jan. 13, 1931 |
| 2,803,718 | Bloom et al. | Aug. 20, 1957 |
| 2,904,652 | Crane et al. | Sept. 15, 1959 |
| 2,906,842 | Brin | Sept. 29, 1959 |

FOREIGN PATENTS

| | | |
|---|---|---|
| 762,363 | Great Britain | Nov. 28, 1956 |

UNITED STATES PATENT OFFICE
CERTIFICATE OF CORRECTION

Patent No. 3,127,596 March 31, 1964

Karl Alfred Näsholm

It is hereby certified that error appears in the above numbered patent requiring correction and that the said Letters Patent should read as corrected below.

Column 2, line 64, for "do" read -- rod --.

Signed and sealed this 14th day of July 1964.

(SEAL)

Attest:

ESTON G. JOHNSON
Attesting Officer

EDWARD J. BRENNER
Commissioner of Patents